May 15, 1923.

E. L. FEESE

ADJUSTABLE BEARING

Filed Jan. 5, 1922

1,455,328

Witness:
Louis W. Helmuth

Elmer L. Feese, Inventor

By Richard B. Owen,

Attorney

Patented May 15, 1923.

1,455,328

UNITED STATES PATENT OFFICE.

ELMER L. FEESE, OF PLEVNA, KANSAS.

ADJUSTABLE BEARING.

Application filed January 5, 1922. Serial No. 527,140.

*To all whom it may concern:*

Be it known that I, ELMER L. FEESE, a citizen of the United States, residing at Plevna, in the county of Reno and State of Kansas, have invented certain new and useful Improvements in Adjustable Bearings, of which the following is a specification.

This invention relates to new and useful improvements in bearings of the adjustable type and more particularly to those designed for eliminating end thrusts of shafts journaled therein.

With this object and others in view the invention aims to provide a simple, yet durable means for adjusting the bearing faces.

Figure 1:
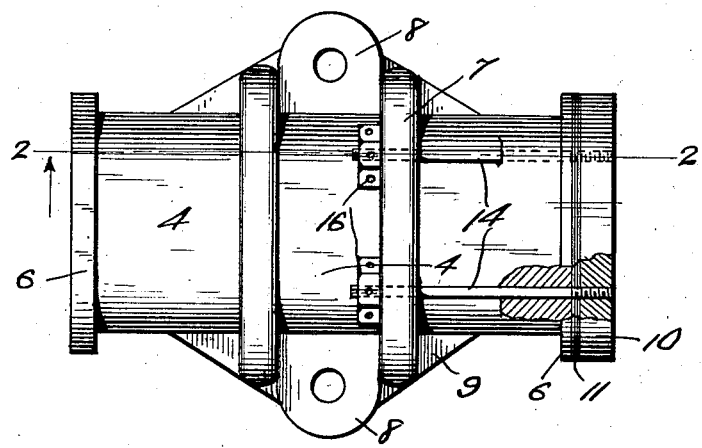
Figure 2:
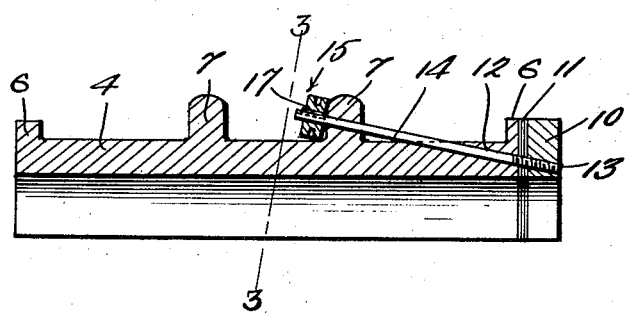
Figure 3:
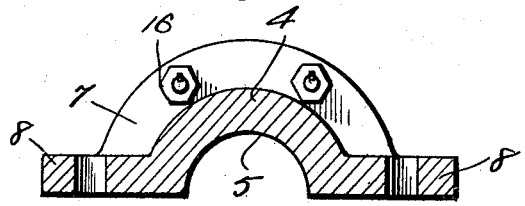

Other objects and advantages of the invention will become apparent during the course of the following description, In the drawing forming a part of the description and wherein like numerals are employed to designate like parts throughout the several views, Figure 1 is a top plan of the bearing with a portion thereof broken away, Figure 2 is a longitudinal section of one half of the bearing on the line 2—2 of Figure 1, and Figure 3 is a transverse section of the same.

In the drawing wherein for the purpose of illustration is shown the preferred embodiment of the invention, I have illustrated only one half of the bearing, it being understood that the other half is of identically the same construction. Each half of the bearing consists of an elongated body portion 4 which has a semi-circular recess 5 extending longitudinally thereof in the well known manner to provide part of a journal for a shaft. The exterior surface of the body portion in the present instance is of convexed configuration. Opposite ends of the body portion are provided with outwardly projecting flanges 6 which extend entirely around the convex outer face of the body portion. The intermediate portion of the body is equipped with a pair of spaced flanges 7 which also extend around the outer surface of the body to reinforce the same. An apertured lug 8 extends laterally from each side of the body intermediate of its ends and web portions 9 are provided between the lugs and body to reinforce the lugs and prevent breakage thereof.

Each half of the bearing is also adapted to embody a separate half 10 of a ring like member which provides the bearing with a removable or adjustable end face. Shims 11 are adapted to be positioned between one end flange 5 and the semi-ring face 10 when compensation for wear is sought.

The body portion 4 between one flange 7 and the flange 6 adapted to be associated with the adjustable face 10 is provided with a pair of inclined openings 12 as is the last mentioned flange 7 and the semi-ring face 10 and shims 11. It is to be particularly noted that the openings through the adjustable faces 10 are screw threaded to cooperate with the lower threaded ends 13 of a pair of tie rods or bolts 14. The outer ends of the bolts adjacent the heads 15 thereof are adapted to pass through the transverse openings in the rib 7. The heads of the bolts may be formed integral with the shanks thereof or may be hexagonal shaped detachable heads 16, each surface of the hexagonal head being equipped with a depression for the insertion of a tool for turning the shank 14. When the heads 16 are detachable from the shaft, means 17 of any suitable character are interposed between the heads 16 and 14.

It is well known that shafts after being in constant use become subject to end thrusts, and especially crank shafts in internal combustion engine. This longitudinally movement of the shaft produces a disagreeable "knock" the presence of which is a source of annoyance. Therefore the above described bearing has been devised to overcome this end play of the crank shaft and in order to remedy the same, any number of shims 11 may be interposed between one end of the bearing and the adjustable face plate 10 to increase the length of the bearing. It will of course be understood that the shims 11 like the face plate 10 are the halves of ring like plates and may be as easily assembled upon the shaft as the end plates 10. After the desired number of shims have been interposed in the manner herein stated, the bolts 14 are passed through the openings in the ribs 7, body 4 shims and face plates 10 and screwed down until the face plates are securely clamped against the shim and the shims in turn clamped firmly against the flanged end of the bearing. The two halves of the bearing are then assembled in the well known manner and bolts are passed through the alined apertured ears or lugs and nuts applied so as to retain the halves of the bearing in operative engagement with the shaft.

The foregoing description and accompanying drawings have reference to what might be considered to be the approved form of the invention, I desire to be understood that I may make changes in the construction, combination, and arrangement of parts, materials, dimensions, etc., as may prove expedient and fall within the scope of the appended claims.

Having thus fully described my invention what I claim as new and desire to secure by Letters Patent, is—

1. A bearing section comprising a body portion having a passage opening at one end into the end of the body and at its opposite end into the periphery of the body, a face plate associated with an end of the body and having an opening therein to aline with the passage in the body, and a bolt extended thru the passage in the body and opening in the face plate and having its head arranged at the periphery of the body.

2. A bearing section comprising a body portion having an inclined opening therethrough extending longitudinally thereof and opening into the outer periphery of the body, a face plate associated with the body portion and having a threaded opening adapted to aline with the opening through the body portion and said bolt having its head arranged on the periphery of the body portion, and a bolt extended through said opening to adjustably mount the face plate upon the body portion.

3. A bearing section comprising a body portion having an outwardly projecting flange thereon provided with an opening, said body portion being also provided with an opening adapted to aline with that in the rib, a face plate detachably associated with the body portion and having a threaded opening therein to aline with the opening aforesaid, shims interposed between the body portion and face plate, and a bolt extended through said openings and into said threaded opening to clamp the face plate to the body portion.

In testimony whereof I affix my signature in presence of two witnesses.

ELMER L. FEESE.

Witnesses:
SIMON BOLLINGER,
ELSIE H. FEESE.